(12) United States Patent
Katz et al.

(10) Patent No.: US 11,949,976 B2
(45) Date of Patent: Apr. 2, 2024

(54) SYSTEMS AND METHODS FOR OBTAINING A SMART PANORAMIC IMAGE

(71) Applicant: Corephotonics Ltd., Tel-Aviv (IL)

(72) Inventors: Ruthy Katz, Tel Aviv (IL); Adi Teitel, Tel Aviv (IL); Gal Shabtay, Tel Aviv (IL); Maya Mayberg, Ramat Hasharon (IL); Noy Cohen, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 130 days.

(21) Appl. No.: 17/535,730

(22) Filed: Nov. 26, 2021

(65) Prior Publication Data

US 2022/0141382 A1 May 5, 2022

Related U.S. Application Data

(63) Continuation-in-part of application No. 17/614,385, filed as application No. PCT/IB2020/061461 on Dec. 3, 2020.

(Continued)

(51) Int. Cl.
*G06V 40/18* (2022.01)
*G06T 7/20* (2017.01)
(Continued)

(52) U.S. Cl.
CPC ............ *H04N 23/611* (2023.01); *G06T 7/20* (2013.01); *G06V 40/18* (2022.01); *H04N 23/45* (2023.01); *H04N 23/69* (2023.01); *H04N 23/698* (2023.01)

(58) Field of Classification Search
None
See application file for complete search history.

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

European Search Report in related EP patent application 20897934.4, dated Oct. 14, 2022.

(Continued)

*Primary Examiner* — Eileen M Adams
(74) *Attorney, Agent, or Firm* — Nathan & Associates; Menachem Nathan

(57) ABSTRACT

Mobile handheld electronic devices such as smartphones, comprising a Wide camera for capturing Wide images with respective Wide fields of view ($FOV_W$), a Tele camera for capturing Tele images with respective Tele fields of view ($FOV_T$) smaller than $FOV_W$, and a processor configured to stitch a plurality of Wide images into a panorama image with a field of view $FOV_P > FOV_W$ and to pin a Tele image to a given location within the panorama image to obtain a smart panorama image.

19 Claims, 5 Drawing Sheets

Related U.S. Application Data

(60) Provisional application No. 62/945,519, filed on Dec. 9, 2019.

(51) Int. Cl.
 *H04N 23/45* (2023.01)
 *H04N 23/611* (2023.01)
 *H04N 23/69* (2023.01)
 *H04N 23/698* (2023.01)

(56) References Cited

U.S. PATENT DOCUMENTS

| | | | |
|---|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |

(56) References Cited

U.S. PATENT DOCUMENTS

| | | |
|---|---|---|
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0313267 A1* | 12/2009 | Girgensohn ............ G06F 16/44 |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0242369 A1* | 10/2011 | Misawa ................ H04N 23/45 348/240.2 |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0181115 A1 | 6/2015 | Mashiah |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0028949 A1 | 1/2016 | Lee et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0064515 A1* | 3/2017 | Heikkila ............ G01S 5/02522 |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0219712 A1* | 8/2017 | Fossati .................... G01S 17/42 |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0041693 A1* | 2/2018 | Saraya .................. H04N 23/63 |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |

(56) References Cited

U.S. PATENT DOCUMENTS

| | | |
|---|---|---|
| 2018/0295292 A1 | 10/2018 | Lee et al. |
| 2018/0300901 A1 | 10/2018 | Wakai et al. |
| 2019/0089941 A1 | 3/2019 | Bigioi et al. |
| 2019/0121103 A1 | 4/2019 | Bachar et al. |
| 2020/0020085 A1* | 1/2020 | Pekkucuksen .......... G06T 5/002 |
| 2022/0277463 A1* | 9/2022 | Schlattmann .......... G06T 7/246 |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

Office Action in related EP patent application 20897934.4, dated Oct. 26, 2022.
Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office Action in related KR patent application 2022-7011016, dated Aug. 7, 2023.
Office Action in related EP patent application 20897934.4, dated Sep. 14, 2023.
Zitova Bet Al: "Image Registration Methods: A Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: i0_i0i6/ S0262-8856(03)00137-9.

* cited by examiner

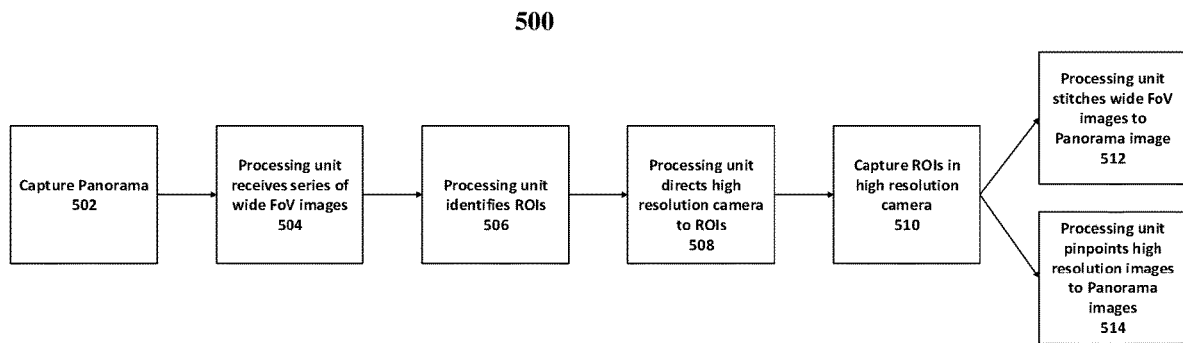
FIG. 5
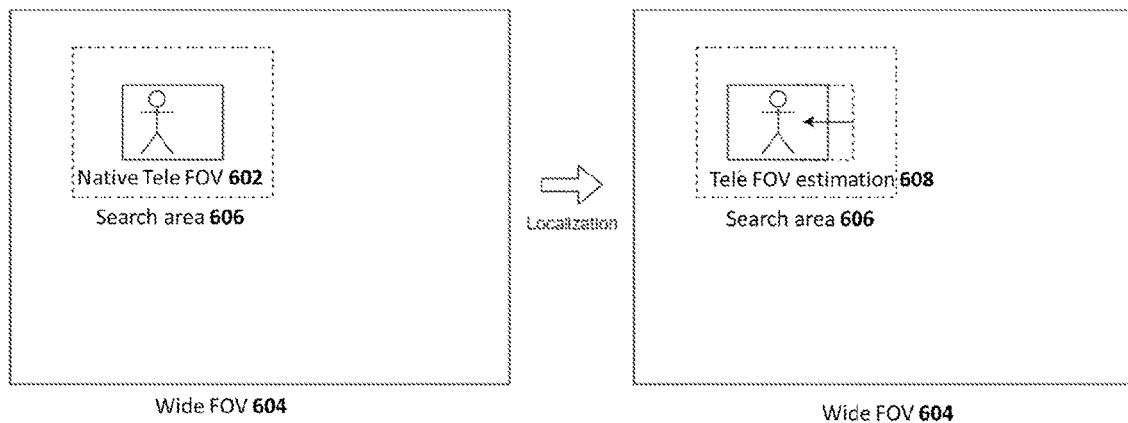
FIG. 6A
FIG. 6B

SYSTEMS AND METHODS FOR OBTAINING A SMART PANORAMIC IMAGE

CROSS-REFERENCE TO RELATED APPLICATIONS

This application is a continuation-in-part (CIP) of U.S. patent application Ser. No. 17/614,385 filed Nov. 26, 2021, which was a 371 of international patent application PCT/IB2020/061461 filed Dec. 3, 2020 and claims priority from U.S. Provisional Patent Application No. 62/945,519 filed Dec. 9, 2019, which is expressly incorporated herein by reference in its entirety.

FIELD

The subject matter disclosed herein relates in general to panoramic images and in particular to methods for obtaining such images with multi-cameras (e.g. dual-cameras).

BACKGROUND

Multi-aperture cameras (or multi-cameras) are becoming the standard choice of mobile device (e.g. smartphone, tablet, etc.) makers when designing cameras for their high-ends devices. A multi-camera setup usually comprises a wide field-of-view (FOV) (or "angle") aperture ("Wide" or "W" camera), and one or more additional lenses, either with the same FOV (e.g. a depth auxiliary camera), with a narrower FOV ("Telephoto", "Tele" or "T" camera, with a "Tele FOV" or $FOV_T$) or with Wide FOV ($FOV_W$) or ultra-wide FOV ($FOV_{UW}$) ("Ultra-Wide" or "UW" camera).

In recent years, panoramic photography has gained popularity with mobile users, as it gives a photographer the ability to capture a scenery and its surroundings with very large FOV (in general in vertical direction). Some mobile device makers have recognized the trend and offer an ultra-wide-angle (or "ultra-Wide") camera in the rear camera setup of a mobile device such as a smartphone. Nevertheless, capturing scenery with a single aperture is limiting, and image stitching is required when a user wishes to capture a large FOV scene.

A panoramic image (or simply "regular panorama") captured on a mobile device comprises a plurality of $FOV_W$ images stitched together. The W image data is the main camera data used for the stitching process, since by having a $FOV_W$, the final (stitched) image (referred to as "Wide panorama") consumes less memory than that required for a Tele camera-based panorama ("Tele panorama") capturing the same scene. Additionally, the W camera has a larger depth-of-field than a T camera, leading to superior results in terms of focus. In comparison with an ultra-W camera, a W camera also demonstrates superior results in terms of distortion.

Since a Wide panorama is limited by the Wide image resolution, the ability to distinguish between fine details, mainly of far objects, is limited. A user who wishes to zoom in towards an object of interest (OOI) or region of interest (ROI) within the panorama image, i.e. to perform digital zoom, will notice a blurred image due to Wide image resolution limits. Moreover, the panoramic image may be compressed to an even lower resolution than the Wide image resolution in order to meet memory constraints.

There is need and it would be beneficial to combine the benefits of a panorama image having a very large FOV and of Tele images having large image resolution.

SUMMARY

To increase the resolution of OOIs, the disclosure provides systems and methods for obtaining a "smart panorama". A smart panorama described herein comprises a Wide panorama and at least one Tele-based image of an OOI captured simultaneously. That is, a smart panorama refers to an image data array comprising (i) a panorama image as known in the art and (ii) a set of one or more high-resolution images of OOIs that are pinned or located within the panorama FOV. While the panorama is being captured, an additional process analyzes the W camera $FOV_W$ scene and identifies OOIs. Once an OOI is identified, the "best camera" is chosen out of the multi-camera array. The "best camera" selection may be between a plurality of cameras, or it may be between a single Tele camera having different operational modes such as different zoom states or different points of view (POVs). The "best camera" selection may be based on the OOI's object size, distance from the camera etc., and a capture request to the "best camera" is issued. The "best camera" selection may be defined by a Tele capture strategy such as described below. In some embodiments with cameras that have different optical zoom states, the "best camera" may be operated using a beneficial zoom state. In other embodiments with cameras that have a scanning FOV, the "best camera" may be directed towards that OOI.

Note that a method disclosed herein is not limited to a specific multi-camera and may be used for any combination of cameras as long as the combination consists of at least two cameras with a FOV ratio different than 1.

In current multi-camera systems, the $FOV_T$ is normally in the center part of the $FOV_W$, defining a limited strip where interesting objects that have been detected trigger a capture request. A Tele camera with a 2D scanning capability extends the strip such that any object detected in the scanning range could be captured, i.e. provides "zoom anywhere". Examples of cameras with 2D scanning capability may be found in co-owned international patent applications PCT/IB2016/057366, PCT/IB2019/053315 and PCT/IB2018/050988.

Tele cameras with multiple optical zoom states can adapt the zoom (and $FOV_T$) according to e.g. size and distance of OOIs. Cameras with that capability may be found for example in co-owned US international patent applications No. PCT/IB2020/050002 and PCT/IB2020/051405.

The panorama being displayed to the user may include some differentiating element marking the area of the panorama where high resolution OOI image information is present. Such a differentiating element marking may include, for example, a touchable rectangle box. By touching the box, the full resolution optically zoomed image will be displayed, allowing the user to enjoy both the panoramic view and the high-resolution zoom-in view.

In various embodiments there are provide handheld mobile electronic devices, comprising: a Wide camera for capturing Wide images, each Wide image having a respective $FOV_W$; a scanning Tele camera (STC) for capturing Tele images, each Tele image having a respective native Tele field of view (n-$FOV_T$) smaller than $FOV_W$, wherein the STC is configured to scan with the native $FOV_T$ within $FOV_W$; and a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user.

In some embodiments, the processor is additionally configured to capture the Wide images autonomously.

In some embodiments, the particular strategy for the autonomous capturing of the Tele images is defined by manual training by the particular user.

In some embodiments, the particular strategy for the autonomous capturing of the Tele images is defined automatically.

In some embodiments, the processor is further configured to define the particular strategy for the autonomous capturing of the Tele images based on a past behaviour of the particular user.

In some embodiments, the processor is further configured to define the particular strategy for the autonomous capturing of the Tele images based on user content of the particular user stored in an image gallery.

In some embodiments, the processor is further configured to define the particular strategy for the autonomous capturing of the Tele images based on gaze tracking of a gaze of the particular user.

In some embodiments, the Wide image data analysis provides a personalized saliency map based on Wide image data.

In some embodiments, the processor is further configured to compare the captured Tele images to captured Wide images for deciding whether a respective Tele image is stored, discarded, or re-captured.

In some embodiments, the processor is further configured to compare captured Wide images with the captured Tele images for deciding whether a respective Wide image is stored, discarded, or re-captured.

In some embodiments, the Tele and/or Wide images are included in video streams of respective Tele and/or Wide images.

In some embodiments, a Wide image is selected to be output to a user from a video stream of Wide images that includes a scene similar to a scene included in a particular Tele image.

In some embodiments, a video stream including Wide and Tele images is composed that continuously zooms into a scene, wherein the video stream uses Wide images for video stream sequences showing a low zoom factor and Tele image for video stream sequences showing a low zoom factor.

In some embodiments, the STC is a continuous zoom camera, configured to switch to a suitable zoom state that depends on the Wide image data analysis.

In some embodiments, the personalized particular strategy for the autonomous capturing of the Tele images according to a preference of a particular user includes a strategy based on face and/or person recognition and/or identification in the Wide and/or STC image data.

In some embodiments, the capturing of the Tele images includes sequentially capturing objects that require similar focus settings. To minimize a capture period duration.

In some embodiments, the personalization according to a particular user preference includes defining particular objects that are of high value for the particular user.

In some embodiments, the particular objects are persons.

In some embodiments, the particular objects are animals.

In some embodiments, the processor configuration to apply a particular strategy for the autonomous capturing of the Tele images that depends on the Wide image data analysis includes a configuration to use a tracking algorithm to apply the particular strategy.

In some embodiments, the processor is further configured to crop a Tele image.

In some embodiments, the Tele image is cropped according to an aesthetic criterion.

In some embodiments, the processor is further configured to use a motion model that predicts a future movement of the handheld device.

In some embodiments, the processor is further configured to use a motion model that predicts a future movement of an object within the $FOV_W$.

In some embodiments, the $FOV_T$ scanning is performed by rotating one optical path folding element.

In some embodiments, the $FOV_T$ scanning is performed by rotating two or more optical path folding elements.

In some embodiments, a handheld device as above or below further comprises an Ultra-Wide camera for capturing Ultra-Wide images, each Ultra-Wide image having a respective Ultra-Wide field of view ($FOV_{UW}$), wherein a particular strategy for the autonomous capturing of the Tele images depends on analysis of Ultra-Wide image data. In some such embodiments, the STC is configured to scan with the native $FOV_T$ within $FOV_{UW}$.

In various embodiments, there is provided a method, comprising: providing an electronic handheld device that includes a Wide camera for capturing Wide images, each Wide image having a respective Wide field of view ($FOV_W$), a scanning Tele camera (STC) for capturing Tele images, each Tele image having a respective Tele field of view ($FOV_T$) smaller than $FOV_W$, wherein the STC is configured to perform $FOV_T$ scanning within $FOV_W$, and a processor; and configuring the processor to capture the Tele images autonomously, using a particular strategy that depends on a Wide image data analysis, wherein a particular strategy for the autonomous capturing of the Tele images is personalized according to a particular user's preferences.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings:

FIG. 5 shows a general workflow of the smart panorama method of use as described herein;

FIGS. 6A and 6B show the localization of the T image within the W image.

DETAILED DESCRIPTION

Figure 1A:
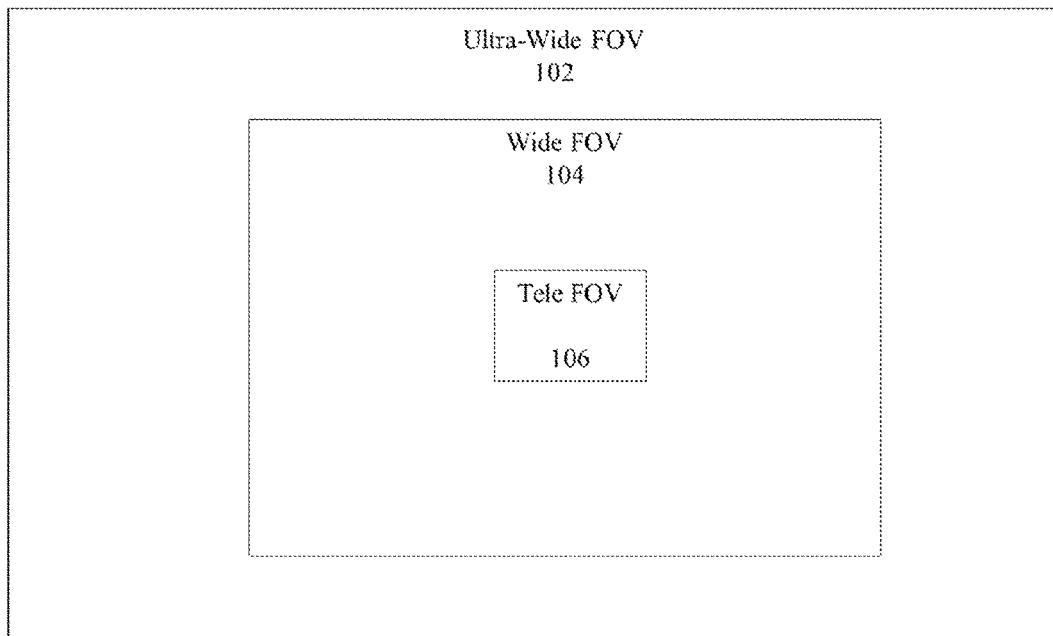
FIG. 1A illustrates exemplary triple camera output image sizes and ratios therebetween.

FIG. 1A illustrates exemplary triple camera output image sizes and ratios therebetween. A triple camera may include three cameras having different FOVs, for example an ultra-Wide FOV (marked $FOV_{UW}$) 102, a Wide FOV (marked $FOV_W$) 104 and a Tele FOV (marked $FOV_T$) 106. Such a triple camera may be applicable for a "smart panorama" method disclosed herein. In such a method, either of the UW or W cameras may be used as a "Wide camera", and the Tele camera may be used to capture high-resolution images of OOIs within a capture time needed to capture the smart panorama.

Figure 1B:
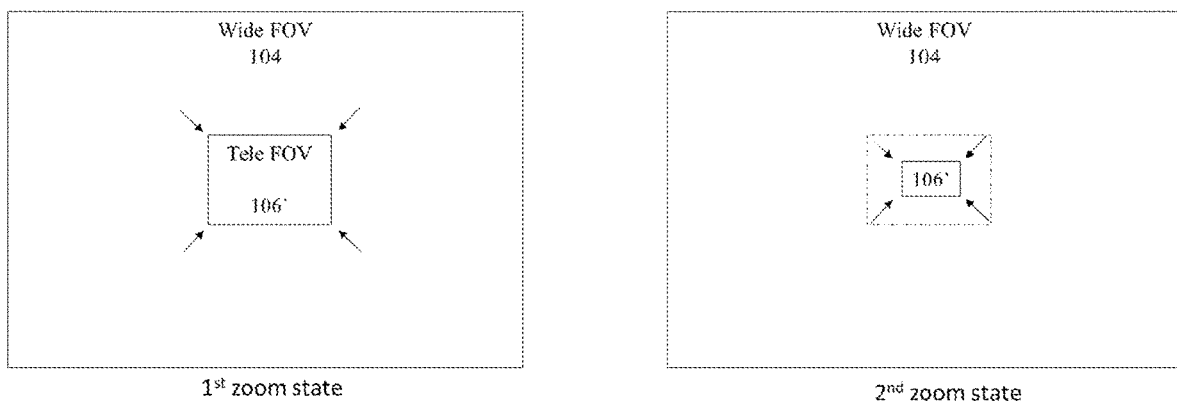
FIG. 1B illustrates exemplary ratios between W and T images in a dual-camera, with the T camera in two different zoom states.

FIG. 1B illustrates exemplary ratios between W and T images in a dual-camera comprising a Wide camera and a Tele camera, with the Tele camera in two different zoom states, $1^{st}$ zoom state and $2^{nd}$ zoom state. Here, the $2^{nd}$ zoom state refers to a state with a higher zoom factor ZF (and smaller corresponding FOV) than the $1^{st}$ zoom state. As above, the W camera has a $FOV_W$ 104. The T camera is a zoom Tele camera that can adapt its zoom factor (and corresponding $FOV_T$ 106'), either between 2 or more discrete zoom states of e.g. ×5 zoom and ×8 zoom, or between any number of desired zoom states (in the limits of the zoom capability) via continuous zoom. While the regular panorama image is based on the W image data only, it is possible to select a specific $FOV_T$ 106' (and corresponding zoom factor) and use this specific $FOV_T$ 106' to capture OOIs with the T camera so that a best user experience is provided for a user of the smart panorama image. It is noted that in the following, the terms "OOI" and "ROI" are used interchangeably.

Figure 1C:
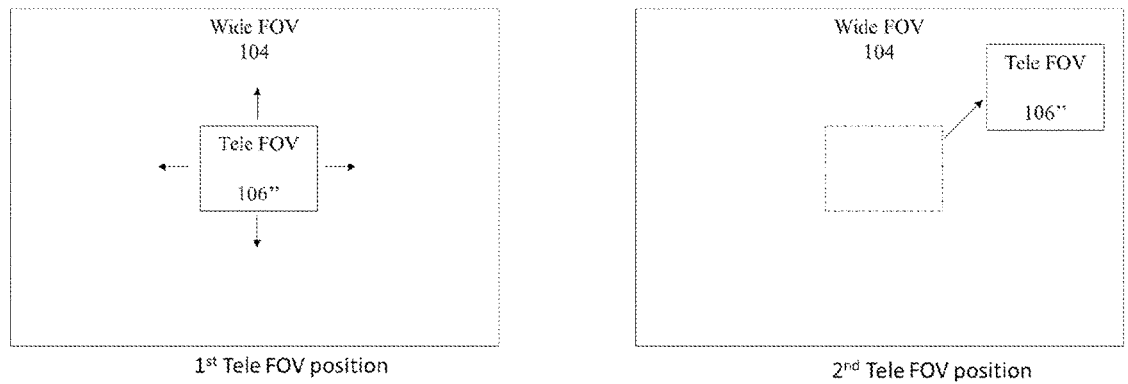
FIG. 1C illustrates the FOVs of dual-camera images, for a dual-camera that comprises a 2D scanning T cameras.

FIG. 1C illustrates the FOVs of dual-camera images, for a dual-camera that comprises a 2D scanning T camera. A 2D scanning T camera has a "native $FOV_T$", wherein the location of the native $FOV_T$ in a scene can be changed, enabling to cover or "scan" a segment of the scene that is larger than the native $FOV_T$. This larger scene segment is referred to as the "effective Tele FOV". FIG. 1C shows a native $FOV_T$ 106" at two different positions within $FOV_W$ 104. The W camera with $FOV_W$ 104 is used for capturing a regular panorama. A ROI or OOI detection method applied to $FOV_W$ is used to direct native $FOV_T$ 106" towards this ROI. Examples of such detection methods are described below. The FOV scanning may be performed by rotational actuation of one or more optical path folding elements (OPFEs). FOV scanning by actuating an OPFE is not instantaneous, since it requires some settling time. FOV scanning may for example require a time scale of about 1-30 ms for scanning 2°-5°, and about 5-80 ms for scanning 10-25°. In some embodiments, the T camera may cover about 50% of the area of $FOV_W$. In other embodiments, the T camera may cover about 80% or more of the area of $FOV_W$.

Regular panorama images can be captured with vertical or horizontal sensor orientation. The panorama capturing direction could be either left-to-right or right-to-left and can comprise any angle of view up to 360 degrees. This capturing is applicable to spherical, cylindrical or 3D panoramas.

Figure 2A:
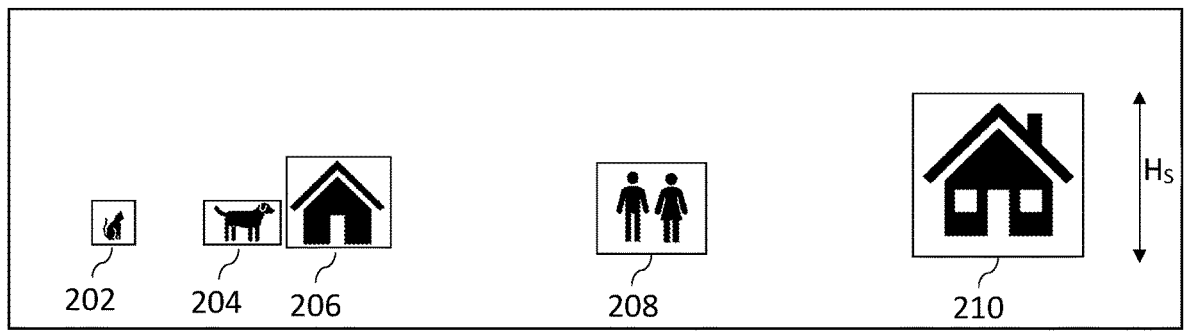
FIG. 2A shows a smart panorama image example, in which certain OOIs are objects located in a limited strip around the center of $FOV_W$.

FIG. 2A shows a smart panorama image example, in which OOIs 202, 204, 206, 208 and 210 are objects located in (restricted to) a limited strip of height $H_S$ around the center of $FOV_W$, the amount of restriction defined by the FOV ratio between the W and T cameras. This strip corresponds to the FOV of a T camera with no scanning capability. OOIs contained in this strip are detected by the smart panorama process and are automatically captured. With a multi-state zoom camera or a continuous zoom camera as T camera, an object (e.g. 202) occupying a solid angle $\Omega_{202}$ in $FOV_W$ may be captured with higher image resolution than that of another object 210 (occupying a solid angle $\Omega_{210}$ in $FOV_W$, where $\Omega_{210} > \Omega_{202}$).

Figure 2B:
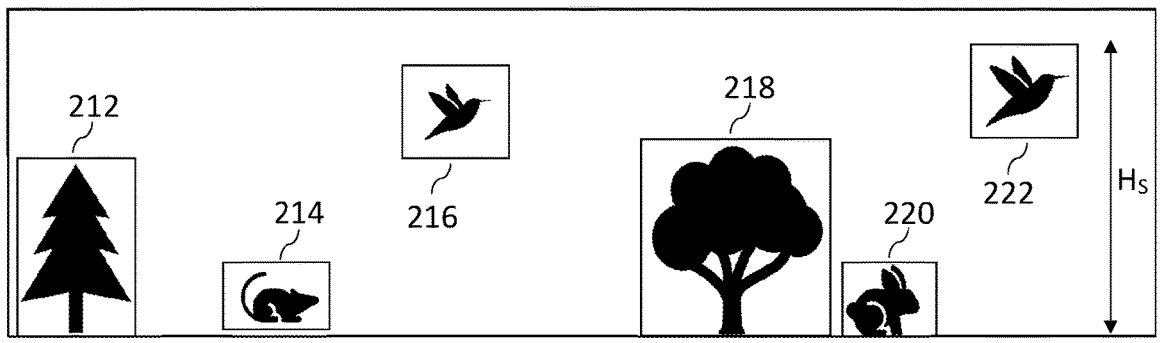
FIG. 2B shows a panorama image example in which certain OOIs are located across a large part of the $FOV_W$.

FIG. 2B shows a smart panorama image example, in which OOIs 212, 214, 216, 218, 220 and 222 are located across a large part of $FOV_W$. The OOIs may also be restricted to a limited strip, but the limits (or height $H_S$) of this strip are significantly larger than in FIG. 2A. A scanning T camera can capture objects located off-center (e.g. object 222) in the 2D scanning range.

Figure 3A:
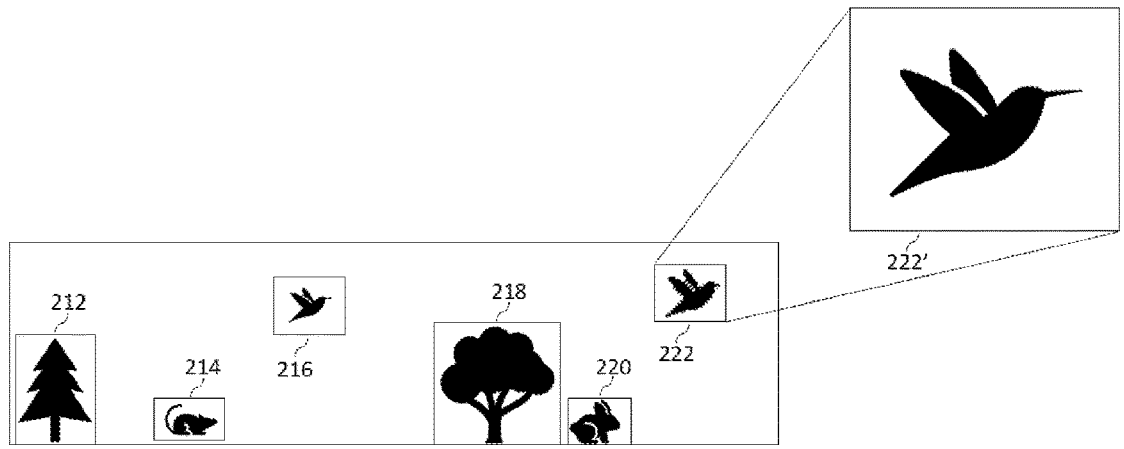
FIG. 3A shows an exemplary embodiment of a smart panorama output from a human user perspective.

FIG. 3A shows an exemplary embodiment of a smart panorama output from a human user perspective. Objects 212, 214, 216, 218, 220 and 222 identified as OOIs and captured with high T image resolution are marked with a rectangle box that may be visible or may not be visible on the smart panorama image, hinting to the user the availability of high-resolution images of OOIs. By clicking one of the boxes (e.g. box 222), the high-resolution image may be accessed and can be displayed to the user in a number of ways, including, but not limited to: in full image preview; in a side-by-side display together with the smart panorama image; in a zoom-in video display combining the panorama, the W image and the T image; or in any other type of display that uses the available images.

Figure 3B:
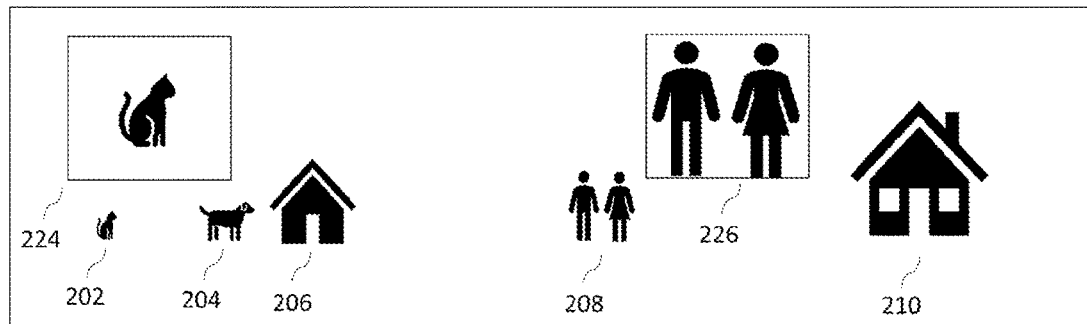
FIG. 3B shows another exemplary embodiment of a smart panorama output from a human user perspective.
Figure 3C:
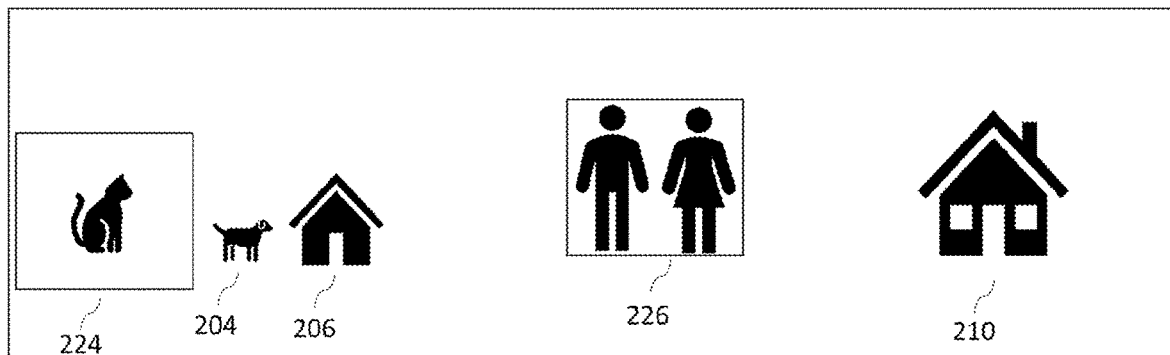
FIG. 3C shows yet another exemplary embodiment of a smart panorama output from a human user perspective.

FIG. 3B and FIG. 3C (which refer to the panoramic scene shown in FIG. 2A) show another exemplary embodiment of a smart panorama output from a human user perspective. Objects 202 and 208, which are identified as OOIs and captured with high T image resolution, may be visible on the panorama image not only in their actual location (and size) but also in an enlarged representation (or scale) such as, respectively, 224 and 226. This enlarged representation may be shown in a suitable segment of the panorama image. A suitable segment may be a segment where no other OOIs are present, where image quality is low, where image artefacts are present, etc. In some examples, this double representation may be used for all OOIs in the scene.

In other examples and as shown in FIG. 3C exemplarily for objects 224 and 226 (which are respectively enlarged representations of objects 202 and 208), one or more OOIs may be shown in their actual location in an enlarged representation, replacing the original non-enlarged OOIs.

Figure 4:
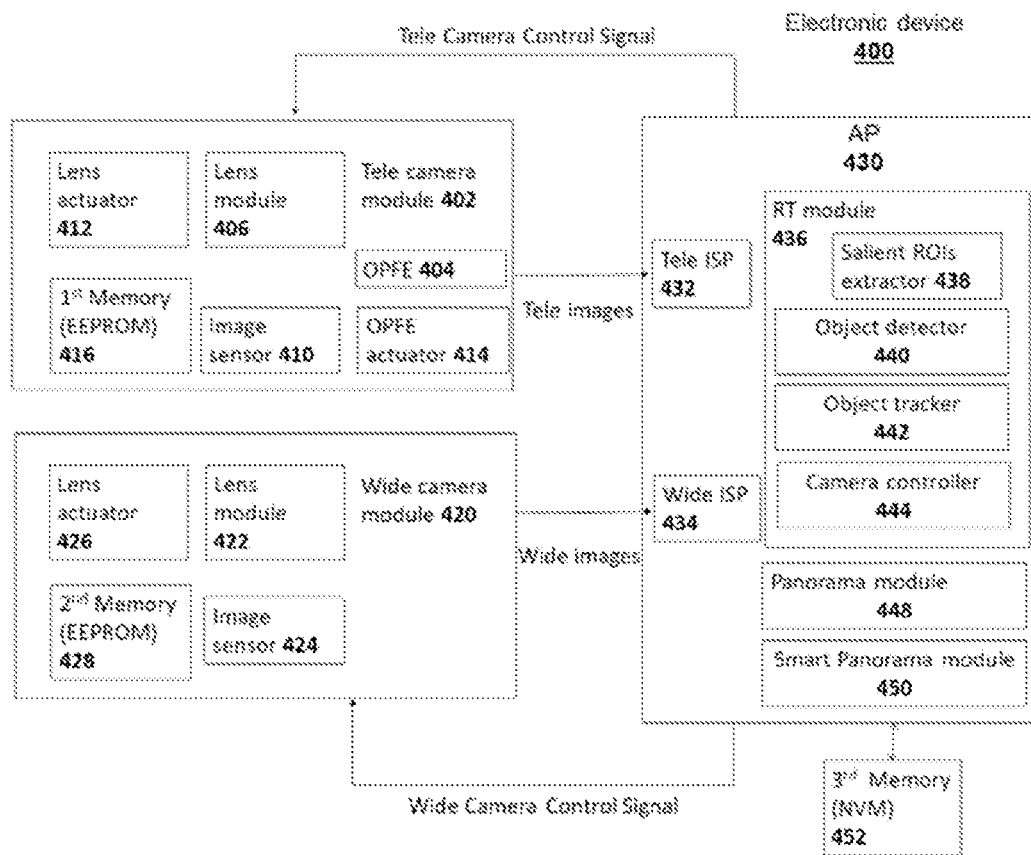
FIG. 4 shows schematically an embodiment of an electronic device capable of providing smart panorama images as described herein.

FIG. 4 shows schematically an embodiment of a mobile handheld electronic device (also referred to simply as "handheld device" or "electronic device" such as, for example, a smartphone) numbered 400 capable of providing smart panorama images as described herein. While the description in detail and exemplarily to a mobile handheld electronic devices in the form of a smartphone, it is equally applicable to other mobile handheld electronic devices such as tablets, laptop computers, etc. Handheld device 400 comprises a first T camera 402 which may be a non-folded (vertical) T camera or a folded T camera. T camera 402 may comprise one or more OPFEs 404 and a first lens module 406 that includes a first lens that forms a first image recorded by a first (T) image sensor 408. T camera 402 is configured to form an image recorded by first T image sensor 410. The first lens may have a fixed effective focal length (fixed EFL) providing a fixed zoom factor (ZF), or it may have an adaptable effective focal length (adaptive EFL) providing an adaptable ZF. The adaptation of the focal length may be discrete or continuous, i.e. a discrete number of varying focal lengths for providing two or more discrete zoom states having particular respective ZFs. Alternatively, the adaptation of the ZF may be continuous. A first lens actuator 412 may move lens module 406 for focusing and/or for optical image stabilization (OIS). An OPFE actuator 414 may actuate OPFE 404 for OIS and/or FOV scanning.

In some embodiments, the FOV scanning of the T camera may be performed by means other than OPFE actuation. In some embodiments, the FOV scanning of the T camera may be performed not by actuating one OPFE, but by actuating two or more OPFEs. A scanning T camera that performs FOV scanning by actuating two OPFEs is described for example in co-owned U.S. provisional patent application No. 63/110,057 filed Nov. 5, 2020. In such cases, Tele camera 402 may include two OPFEs (not shown).

In some embodiments, first calibration data may be stored in a first memory 416 of the T camera, e.g. in an EEPROM (electrically erasable programmable read only memory). In other embodiments, first calibration data may be stored in a third memory 452, which may be a non-volatile memory (NVM).

Handheld device 400 further comprises a Wide (W) camera 420 with a $FOV_W$ larger than the $FOV_T$ of T camera 402. W camera 420 may comprise a second lens module 422 that forms an image recorded by a second (W) image sensor 424. A second lens actuator 426 may move lens module 422 for focusing and/or for OIS. In some embodiments, handheld device 400 may further include an Ultra-Wide camera.

Handheld device 400 may further comprise an application processor (AP) 430. Application processor 440 comprises a T image signal processor (ISP) 432 and a W image ISP 434. Application processor 430 further comprises a Real-time module 436 that includes a salient ROI extractor 438, an object detector 440, an object tracker 442 and a camera controller 444. Application processor 440 further comprises a panorama module 448 and a smart panorama module 450.

In some embodiments, the first calibration data may comprise calibration data between sensors of W camera 420 and T camera 402. In some embodiments, second calibration data may be stored in a second memory 428. In some embodiments, the second calibration data may be stored in third memory 452. The second calibration data may comprise calibration data between sensors of a W module 420 and the T module 402. The T module may have an effective focal length (EFL) of e.g. 8 mm-30 mm or more, a diagonal FOV of 10 deg-40 deg and a f number of about f/#=1.8-6. The W module may have an EFL of e.g. 2.5 mm-8 mm, a diagonal FOV of 50 deg-130 deg and f/#=1.0-2.5.

In use, a processing unit such as AP 430 may receive respective Wide and T image data from cameras 402 and 420 and supply camera control signals to cameras 402 and 420.

Salient ROI extractor 438 may calculate a saliency map for each W image. The saliency maps may be obtained by applying various saliency or salient-object-detection (SOD) algorithms, using classic computer vision methods or neural networks models. Examples to saliency methods can be found in datasets known in the art such as the "MIT Saliency Benchmark" and the "MIT/Tuebingen Saliency Benchmark". Salient ROI extractor 438 also extracts salient Regions-Of-Interest (ROIs) and may contain the OOIs discussed above. For each salient object (or ROI), a surrounding bounding box is defined which may include a scene segment and a saliency score. The saliency score may be used to determine the influence of an object on future decisions as described in later steps. The saliency score is selected as a combination of parameters that reflect object properties, for example the size of the object and a representation of the saliency scores in each object.

In some embodiments, object detector 440 may detect objects in the W image simultaneously with the calculation of the saliency map and may extract and provide a semantic understanding of the objects in the scene. The extracted semantic information may be considered in calculating the saliency score.

In other embodiments, object detector 440 may detect objects in the W image after calculation of the saliency map. Object detector 440 may use only segments of the W image, e.g. only segments that are classified as saliency ROIs by salient ROI extractor 438. Object detector 440 may additionally provide a semantic understanding of the ROIs wherein the semantic information may be used to re-calculate the saliency score.

Object detector 440 may provide data such as information on an ROI's location and classification type to an object tracker 442, which may update camera controller 444 on the ROI's location as well as to the camera controller 444. Camera controller 444 may consider capturing a ROI in dependence of particular semantic labels or of a ROI's location (e.g. for considering hardware limitation such as a limited Tele FOV coverage of the Wide FOV) within the Wide FOV or of a saliency score above a certain threshold etc.

Panorama module 448 may stitch a plurality of W images to a panorama image as known in the art. Smart panorama module 450 matches the high-resolution ROIs to their corresponding locations on the panorama image and to an image selection module (not shown) that selects the T images that are to be used in the smart panorama image.

Camera controller 444 may select or direct the T camera to capture the ROIs according to different Tele capture strategies for providing a best user experience. For providing a best user experience, camera controller 444 may provide a "best camera" mode according to different Tele capture strategies, e.g. by selecting a suitable ZF or by directing the native $FOV_T$ towards a ROI within the $FOV_T$.

In some examples, a "best user experience" may refer to T images of ROIs that provide information on OOIs in highest resolution (Tele capture "strategy example 1" or "SE 1"), and a respective Tele capture strategy that provides this may be selected. However, in other examples a best user experience may be provided by strategy examples such as:

capturing the Tele ROI that contains the OOI with the highest saliency score ("SE 2");

capturing multiple OOIs in one ROI Tele capture ("SE 3");

using a uniform or non-uniform depth-of-field distribution between the different ROI Tele captures ("SE 4");

including not only the OOI, but also a certain amount of background ("SE 5") e.g. so that aesthetic cropping can be applied;

capturing a plurality of ROIs with a particular zoom factor ("SE 6");

capturing multiple OOIs in one ROI Tele capture, wherein the OOIs may be distributed according to a particular distribution within the Tele FOV ("SE 7");

capturing one or more OOIs in one ROI Tele capture, wherein the OOIs are to be located at particular positions or areas within the T image ("SE 8");

capturing a plurality of ROIs with particular zoom factors, such that the images of the ROIs or of particular OOIs which are formed on the image sensor may have a particular image size ("SE 9");

using a particular spectroscopic or colour composition range ("SE 10");

using a particular brightness range ("SE 11"); a particular scene characteristics which may be visual data ("SE 12") such as texture;

including not only an OOI but also a certain amount of background, wherein the T camera settings may be selected so that the OOI may be in focus and the background may have some particular degree of optical bokeh ("SE 13") or may have a minimal or maximal degree of optical bokeh ("SE 14");

capturing with a higher preference specific types of OOIs, e.g. a user may be able to select whether animals, plants, buildings, humans, etc. may be captured by the Tele with a higher preference ("SE 15"); or capturing a preferred type of OOI with higher preference in some particular state or condition, e.g. a human may be captured with open eyes with a higher preference or a bird may be captured with open wings with higher preference ("SE 16") etc.; or capturing Tele ROIs sequentially that require similar focus settings ("SE 17") to minimize the capture period duration; or using any other criteria known in photography for best user experience.

The Tele capture strategies may be defined respectively for providing a best user experience and respective best camera mode. According to the Tele capture strategy, camera controller 444 may adjust the settings of the T camera, e.g. with respect to a selected zoom factor, to a selected f number, to a POV that the scanning camera may be directed to, etc. Other techniques described herein such as the calculation of a saliency map or the application of a motion model or the use of an object tracking algorithm may be used or adapted e.g. by modifying settings to implement a particular Tele capture strategy.

In some embodiments, camera controller 444 may decide to capture a ROI that is a sub-region of an OOI that exceeds the native $FOV_T$ boundaries. Such objects may be referred to as "large" objects. When a "large" object is selected, salient ROIs extractor 438 may calculate an additional saliency map on the segment of the Wide FOV that contains the large object. The saliency map may be analysed, and the most visually attentive (or "interesting", "salient") sub-region of the large object may be selected to be captured by the T camera. For example, the sub-region may replace the large object data in following calculation steps. Camera controller 444 may direct a scanning T camera towards the sub-region for capturing it.

Smart panorama module 450 may decide whether to save (capture) or discard a T image, e.g. smart panorama module 464 may save only the "best" images out of all T images captured. The best images may be defined as images that contain the largest amount of salient information. In other embodiments, the best images may include particular objects that may be of high value for the individual user, e.g. particular persons or animals Smart panorama module 450 may be taught automatically (e.g. by a machine learning procedure) or manually by the user to decide which ROIs are to be considered best images. In yet other embodiments, the best image or images may be an image captured with a particular zoom factor, or a plurality of images including a ROI each, wherein each ROI may be captured with a particular zoom factor or some other property, e.g. so that the images of the ROIs which are formed on the image sensor may have a particular size, or a particular spectroscopic or colour composition range, or with a minimum degree of focus or defocus, or a particular brightness range, or a particular scene characteristics that may be visual data such as texture. In some embodiments, smart panorama module 450 may verify that newly captured images have FOVs that do not overlap with previously saved (i.e. already selected) images.

In some embodiments for autonomous STC image capture, smart panorama module 450 may analyse W image data for defining a personalized autonomous capture strategy, i.e. a strategy that is adapted to the preferences of a particular user, e.g. to preferred persons, animals or objects like cars. An AP module like smart panorama module 450 may be configured to autonomously capture Wide images. Alternatively or in addition, another AP module like camera controller 444 may be configured to autonomously capture STC images. In some examples, a first personalized autonomous capture strategy example (PASE) (PASE 1) may be defined by a human user. An autonomous capture strategy may be implemented by configuring salient ROI extractor 438 to prioritize particular objects that are of high value for a particular user, and calculate a personalized saliency map based on Wide image data accordingly. In some examples, algorithms for detecting and/or recognizing and/or identifying faces and/or persons and/or objects may be used. For example, in some initial training step, the user may teach the device his priorities by indicating which objects are more desired or less desired for being captured with the STC, and salient ROI extractor 438 may be configured accordingly. In a second example ("PASE 2"), the device may be taught automatically based on past behavior of a user. For example, salient ROI extractor 438 may be configured depending on which images the user stored, shared or discarded in the past. In a third example ("PASE 3"), salient ROI extractor 438 may be configured depending on the content a user stores in his image gallery. Salient ROI extractor 438 may be trained to assign a higher or lower priority to objects that appear more frequently or less frequently respectively in the user's images that are stored in a gallery. In a fourth example ("PASE 4"), salient ROI extractor 438 may be configured depending on real-time (RT) data captured by device 400. Such RT data may e.g. be data on the user's gaze direction, with respect to a position on a mobile device's screen that shows a scene or within a scene itself, e.g. sensed by an eye-tracking camera. Objects located in FOV segments that a user is gazing at may be captured with higher priority. Other RT data may e.g. be a directional microphone included in the device. Yet other RT data may e.g. be data generated from a user touching the touchscreen to focus on (or select) an OOI or ROI. Object tracker 442 may track the selected OOI or ROI to accurately capture it once a capture button is pressed. In a fifth example ("PASE 5") where salient ROI extractor 438 may detect more than one ROI or OOI in one native $FOV_T$, and wherein the ROIs or OOIs are located at different object-lens distances (or "focus distances"), camera controller 444 may be configured to capture sequential STC images with a different ROI or OOI in focus in each STC image.

In some embodiments, AP 430 may be configured to perform an analysis for deciding whether an image is stored or discarded. AP 430 may compare a scene segment shown in a STC image with the same scene segment shown in a simultaneously captured Wide image for deciding whether to store or to discard a STC image. A STC image may be discarded in following cases:

the STC image shows a scene significantly different than the scene shown in the Wide image (e.g. as of motion occurring between the capture of the STC and the Wide image).

the STC image shows a scene that is in significant semantic disagreement with the scene shown in the Wide image.

the STC image shows a scene that, with respect to the Wide image, adds only a low degree of additional scene information, i.e. the STC image may be considered not sufficiently important.

the STC image shows a scene that is not considered to be a good image (i.e. person blinked during capture)

the STC image shows a scene which is similar to a scene included in an already stored or previously captured other STC image.

In some of the cases where a STC image is discarded, camera controller 444 may be configured to re-capture a same scene segment with the STC image. In some embodiments where a stream of Wide images and a stream of STC images are captured, AP 430 may compare the scene segments shown in the STC and the Wide image stream for selecting subsets of STC and Wide images that are in semantically and visually agreement with each other. For example, AP 430 may select one Wide image and one to five STC images that show ROIs within the Wide image scene. In other embodiments where a stream of Wide images and a stream of STC images are captured, AP 430 may compose a video stream including both Wide and STC images, e.g. for continuously and/or smoothly zoom into a scene segment included in the STC image. As an example, the video stream may use Wide images for video stream sequences showing a low zoom factor, and it may use Tele images for video stream sequences showing a low zoom factor. "Low zoom factor" may refer to a zoom factor which is lower than the STC's zoom factor with respect to the W camera. In other examples, "low zoom factor" may refer to a zoom factor that is lower than 1.5 times the STC's zoom factor with respect to the W camera.

In some embodiments, AP 430 may be configured to assist a user in framing a scene. For example, a ROI may be detected in a segment of $FOV_W$ which is not or only partially covered by the (effective) Tele FOV of the STC. In this example, a mobile device may indicate a user to move the mobile device with respect to the scene so that the ROI will be covered by the Tele FOV and $FOV_W$. The ROI can then be captured by both W camera and STC.

In some examples for displaying W and STC images captured by a PASE to a user, the W and STC images may be displayed as a "image collage" as known in the art. In other examples, they may be displayed as a "slideshow" as known in the art. In yet other examples and for displaying W and STC images captured in a PASE 5 scenario, the STC images may be fused into a W image or into another STC image, e.g. for obtaining a synthetic "all-in-focus" image where all ROIs and OOIs included are in focus, or where all ROIs and OOIs included in the native $FOV_T$ are in focus, or for obtaining an image that synthetically creates a focus setting that represents an "in-focus" compromise for all ROIs and OOIs included, which in general resembles a capture scenario where the synthetic focus distance is set between the maximum and minimum focus distances which are present in the ROIs and OOIs.

In yet other examples and for displaying W and STC image streams captured by a PASE to a user, the W and STC image streams may be displayed as a video stream displaying W images (or segments thereof) for lower zoom factors and STC images (or segments thereof) for high zoom factors. The transitions between the W image stream and the STC image stream may be smooth transitions as known in the art.

The fault detection may for example raise an error in case that a particular threshold in terms of image quality or scene content may not be met.

In some embodiments, object tracker 442 may track a selected ROI across consecutive W images. Different tracking methods may be used, see e.g. Henriques et al. "High-speed tracking with kernelized correlation filters" published in IEEE Transactions on Pattern Analysis and Machine Intelligence (Volume: 37, Issue: 3, Mar. 1 2015, Pages 583-596). The object tracking may proceed until the ROI is captured by the T camera or until the object tracking process fails. In some embodiments, object tracker 442 may be configured as well for predicting a future position of the ROI, e.g. based on a current camera position and some motion model. For this prediction, an extension of a Kalman filter or any other motion estimation as known in the art may be used. Examples to Kalman filter methods can be found in the article "An Introduction to the Kalman Filter", published by Welch and Bishop in 1995. The position prediction may be used for directing the scanning T camera to an expected future ROI position. In some embodiment, also the estimated future velocity or movement of an ROI may be considered. The velocity may refer to the velocity of e.g. an OOI with respect to other objects in the scene or to the velocity of e.g. an OOI with respect to the movement of handheld device 400. In other embodiments, AP 430 is further configured to use a motion model that predicts a future movement of handheld device 400.

In other embodiments, camera controller 444 may be configured to perform fault detection. The fault detection may for example raise an error in case that a particular threshold in terms of image quality or scene content may not be met. For example, an error may be raised if a certain threshold of (a) motion blur, (b) electronic noise, (c) defocus blur, obstructions in the scene or other undesired effects may be detected in the image. In some examples, in case a ROI image raised an error, this image will not be considered for a smart panorama image and a scanning T camera may be instructed to re-direct to the scene segment comprising the ROI and to re-capture the ROI.

In other embodiments, camera controller 444 may consider further user inputs for a capture decision. User inputs may be intentional or unintentional. For example, eye tracking may be used to make a capture decision. For example, a user-facing camera may be used to automatically observe the eye movement of a user when watching on a screen of a camera hosting device or on the scene itself. For example, in case a user's eyes stay a significantly longer time on a particular scene segment than they stay on other scene segments, the given segment may be considered important to the user and may be captured with increased priority.

In other embodiments and for example for capturing objects that are large with respect to the Tele FOV or for capturing objects with very high resolution, camera controller 444 may be configured to capture a ROI not by a single T image, but by a plurality of T images that include different segments of an ROI. The plurality of T images may be stitched together to one image that may display the ROI in its entirety.

A final selection of best images may be performed by smart panorama module 450. Smart panorama module 450 may e.g. consider (i) the maximal storage capacity, (ii) FOV overlap across saved images, and (iii) the spatial distribution of the ROIs on a panorama FOV. Smart panorama module 450 additionally includes a cropping module (not shown) that aims to find the cropping window that satisfies criteria such as providing best user experience as described above, as well as criteria from aesthetic image cropping, e.g. as described by Wang et al in the article "A deep network solution for attention and aesthetics aware photo cropping", 2018.

In some embodiments, smart panorama module 450 may perform an additional saliency calculation on a stitched image with a FOV wider than the Wide FOV. For example, saliency information can be calculated by applying a saliency or SOD model on a segment of, or on the entire the panorama FOV.

In other embodiments, smart panorama module 450 may use semantic information to select T images to be used in the smart panorama image, e.g. by applying a detection algorithm. The chances of selecting a T image to be used in the smart panorama image may e.g. be elevated if human faces were detected by a face detection algorithm.

The selected T images may be exemplarily displayed to the user via a tap on a rectangle marked on the smart panorama image, or with zoom transition from the smart panorama FOV to the native Tele FOV via zoom pinching.

FIG. 5 shows a general workflow of the smart panorama "feature" (or method of use) as described herein, which could for example be implemented on (performed or carried out in) an handheld device such as device 400. The capture process starts with the capturing of a regular panorama image in step 502. A processing unit such as AP 430 receives a series of W (Wide) images as the user directs the W camera along the scene in step 504. The W images may be captured autonomously. The W images are processed by a RT module such as 436 to identify OOIs and ROIs in step 506. After ROIs are identified, in case of a 2D scanning camera, a processing unit may direct a high-resolution T camera to the region of interests in step 508. In case of a "centered $FOV_T$ camera" (i.e. a T camera with a $FOV_T$ centered with respect to the Wide FOV) with multiple zoom states, camera controller 444 may select a beneficial zoom state for capturing the T image during the regular panorama capture. Here, the term "beneficial zoom state" may refer to a zoom state that provides best user experience as described above. With the T camera directed towards the ROI, T images are captured in step 510. In case fault detection is performed and raises an error message, one may return to step 508, i.e. the processing unit may re-direct the high-resolution Tele camera to the ROI and capture it again. Eventually the W images are stitched by panorama module 448 to create a regular panorama image in step 512. In step 514, smart panorama module 450 decides which T images are to be included in the smart panorama and pins the chosen T images locations to the panorama image with very high resolution.

In some examples, image data of the T images captured in step 510 may be used for the regular panorama image.

In another embodiment with a centered $FOV_T$ camera, the processing unit may determine the right timing for capturing the T image during the panorama capture.

FIG. 6A-B shows the localization of the T image within the W image. The localization may be performed in step 508 for directing a high resolution camera to an ROI or in step 514 for pinning a T image into a particular location in the panorama image. The T image may be captured by a STC or by a non-scanning Tele camera.

In FIG. 6A, the STC FOV 602 is shown at an estimated POV within the Wide camera FOV 604. The STC $FOV_T$ estimation with respect to the W FOV 604 is acquired by the Tele-Wide calibration information which in general may rely on position sensor measurements that provide OPFE position data. Since the $FOV_T$ estimation is calibration dependent, it may be insufficiently accurate in terms of matching the T image data with the W image data. Typically, before localization, image points of a same object point may e.g. deviate by more than 25 pixels or by more than 50 pixels or by more than 100 pixels between the Wide and Tele camera. We assume a pixel size of about 1 μm.

To improve the accuracy of the $FOV_T$ estimation over $FOV_W$, Tele image localization is performed. The localization process includes:

1. selection of a search area 606 as shown in FIG. 6A. The selection may be based on the prior (calibration based) estimation. The search area may be defined by the FOV center of the prior estimation which may be, e.g. symmetrically, embedded in a rectangular area wherein the rectangular area may e.g. be of twice or three times or four times the area as the area covered by a $FOV_T$.
2. cropping of the search area from the $FOV_W$ frame.
3. The next step may include template matching, wherein a source may be represented by the cropped search area, and a template may be represented by the $FOV_T$ frame. This process may e.g. be performed by cross-correlation of the template over different locations of the search area or over the entire search area. The location with a highest matching value may indicate a best estimation of the $FOV_T$ location within the $FOV_W$. Numeral 608 indicates the final estimated Tele FOV after the localization.

Typically, after the localization image points of a same object point may e.g. deviate by less than 20 pixels or by less than 10 pixels or even by less than 2 pixels between the Wide and Tele camera.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:
1. A handheld device, comprising:
    a Wide camera for capturing Wide images, each Wide image having a respective Wide field of view ($FOV_W$);
    a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
    a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the Wide image data analysis provides a personalized saliency map based on Wide image data.

2. The handheld device of claim 1, wherein the processor is additionally configured to capture the Wide images autonomously.

3. The handheld device of claim 1, wherein the particular strategy for the autonomous capturing of the Tele images is defined by manual training by the particular user.

4. The handheld device of claim 1, wherein the personalization according to a particular user preference includes defining particular objects that are of high value for the particular user.

5. The handheld device of claim 4, wherein the particular objects are persons.

6. The handheld device of claim 4, wherein the particular objects are animals.

7. The handheld device of claim 1, wherein the processor is further configured to crop a Tele image.

8. The handheld device of claim 1, wherein the processor is further configured to use a motion model that predicts a future movement of the handheld device.

9. The handheld device of claim 1, wherein the processor is further configured to use a motion model that predicts a future movement of an object within the $FOV_W$.

10. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data wherein the particular strategy for the autonomous capturing of the Tele images is defined automatically, and to personalize the particular strategy for the autonomous capturing of the Tele images according to a preference of a particular user, wherein the processor is further configured to define the particular strategy for the autonomous capturing of the Tele images based on a past behaviour of the particular user.

11. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$ wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the particular strategy for the autonomous capturing of the Tele images is defined automatically, and wherein the processor is further configured to define the particular strategy for the autonomous capturing of the Tele images based on user content of the particular user stored in an image gallery.

12. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data wherein the particular strategy for the autonomous capturing of the Tele images is defined automatically, and to personalize the particular strategy for the autonomous capturing of the Tele images according to a preference of a particular user, wherein the processor is further configured to define the particular strategy for the autonomous capturing of the Tele images based on gaze tracking of a gaze of the particular user.

13. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the Tele and/or Wide images are included in video streams of respective Tele and/or Wide images, wherein a Wide image is selected to be output to a user from a video stream of Wide images that includes a scene similar to a scene included in a particular Tele image.

14. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$ wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the personalized particular strategy for the autonomous capturing of the Tele images according to a preference of a particular user includes a strategy based on face and/or person recognition and/or identification in the Wide and/or STC image data.

15. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the processor configuration to apply a particular strategy for the autonomous capturing of the Tele images that depends on the Wide image data analysis includes a configuration to use a tracking algorithm to apply the particular strategy.

16. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the $FOV_T$ scanning is performed by rotating one optical path folding element.

17. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, wherein the $FOV_T$ scanning is performed by rotating two or more optical path folding elements.

18. A handheld device, comprising:
a Wide camera for capturing Wide images, each Wide image having a respective Wide field of view ($FOV_W$);
a scanning Tele camera (STC) for capturing Tele images, each Tele image having a respective native Tele field of view ($FOV_T$) smaller than $FOV_W$, wherein the STC is configured to scan with the native $FOV_T$ within $FOV_W$; and
a processor configured to capture the Tele images autonomously, to apply a particular strategy for the autonomous capturing of the Tele images that depends on an analysis of Wide image data, and to personalize the particular strategy for the autonomous capturing of the Tele images according to a preference of a particular user, further comprising an Ultra-Wide camera for capturing Ultra-Wide images, each Ultra-Wide image having a respective Ultra-Wide field of view ($FOV_{UW}$), wherein a particular strategy for the autonomous capturing of the Tele images depends on analysis of Ultra-Wide image data.

19. The handheld device of claim 18, wherein the STC is configured to scan with the native $FOV_T$ within $FOV_{UW}$.

* * * * *